United States Patent [19]

Fitz et al.

[11] Patent Number: 5,114,109

[45] Date of Patent: May 19, 1992

[54] TELESCOPICALLY EXTENSIBLE LIFTING COLUMN, IN PARTICULAR FOR THE HEIGHT ADJUSTMENT OF A CAMERA

[75] Inventors: Erich Fitz, Vagen; Klaus Resch, Munich, both of Fed. Rep. of Germany

[73] Assignee: HTG High Tech Geratebau GmbH, Oberhaching, Fed. Rep. of Germany

[21] Appl. No.: 769,816

[22] Filed: Oct. 2, 1991

[30] Foreign Application Priority Data

Oct. 2, 1990 [DE] Fed. Rep. of Germany ....... 4031105

[51] Int. Cl.$^5$ ............................................ F16M 11/00
[52] U.S. Cl. .................................. 248/404; 248/669; 248/161
[58] Field of Search ...................... 248/161, 162.1, 404, 248/332, 280.1, 292, 669; 297/339, 347; 108/147; 254/374, 293

[56] References Cited

U.S. PATENT DOCUMENTS

| | | | |
|---|---|---|---|
| 2,081,248 | 5/1937 | Murphy | 248/161 |
| 2,215,666 | 9/1940 | Meitzler | 248/404 X |
| 2,471,998 | 5/1949 | Berggren | 248/669 X |
| 2,901,202 | 8/1959 | Stava et al. | 248/669 X |
| 3,575,368 | 4/1971 | Thomas et al. | 248/669 X |
| 4,605,189 | 8/1986 | Bruncau | 248/162.1 |

FOREIGN PATENT DOCUMENTS

| | | | |
|---|---|---|---|
| 509334 | 10/1930 | Fed. Rep. of Germany | 248/161 |
| 1529723 | 12/1966 | Fed. Rep. of Germany | 248/404 |
| 1218457 | 12/1959 | France | 248/162.1 |
| 541435 | 3/1956 | Italy | 248/161 |

Primary Examiner—Karen J. Chotkowski
Attorney, Agent, or Firm—Fleit, Jacobson, Cohn, Price, Holman & Stern

[57] ABSTRACT

A telescopically extensible lifting column, particularly for the height adjustment of a camera, consists of an external column member resting on a base plate, a middle column member which is telescopically extensible from the external column member, and a central column which is extensible from the middle column member and on which the camera can be mounted. By means of a piston/cylinder type drive device, the middle column member can be pressurized pneumatically in relation to the stationary external column member. The drive device also has a traction cable which is wound or a deflection member mounted rotatably on the middle column member. The cable is connected by means of its inner end portion to the central column member and by means of its outer end portion to the external column member. The deflection member has a section which is in the form of a truncated cone with a guide groove, which runs spirally along the cone envelope surface from a region of larger diameter to a region of smaller diameter, to receive the traction cable. The deflection member further has an additional section with a guide groove extension on which, during extension of the lifting column, the inner cable end portion is wound while unwinding the outer cable end portion from the first section.

2 Claims, 1 Drawing Sheet

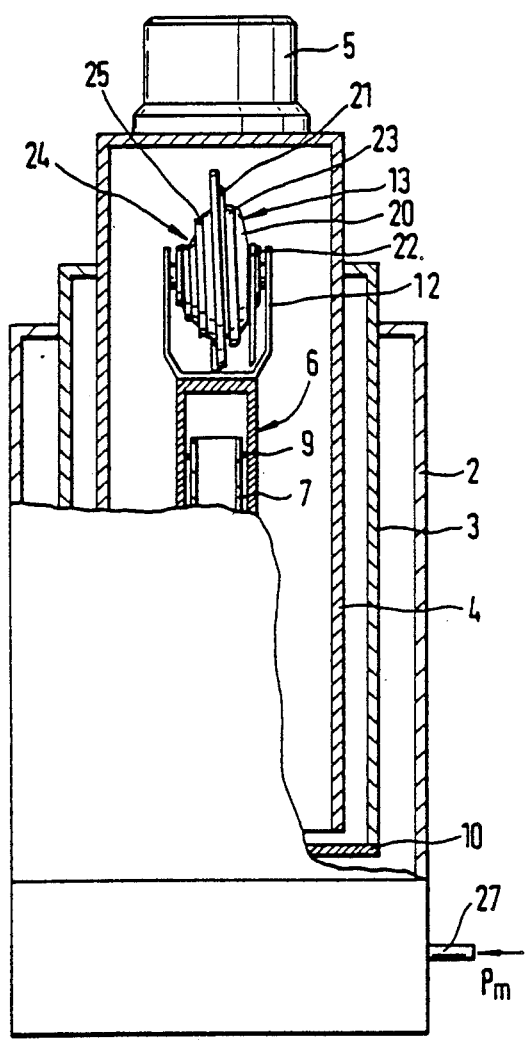
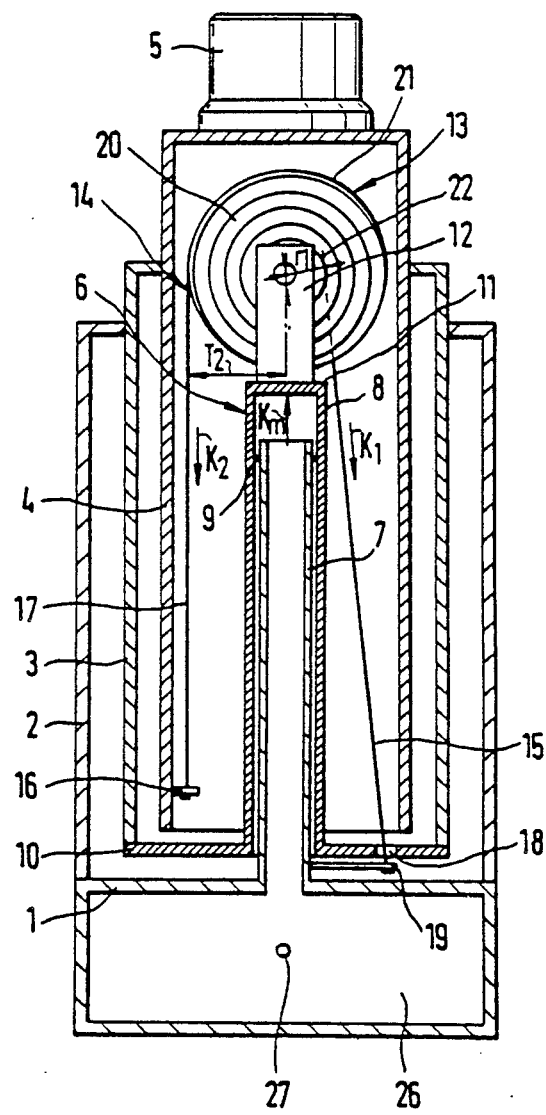

TELESCOPICALLY EXTENSIBLE LIFTING COLUMN, IN PARTICULAR FOR THE HEIGHT ADJUSTMENT OF A CAMERA

BACKGROUND OF THE INVENTION

This invention relates to a telescopically extensible lifting column, in particular for the height adjustment of a camera, and consisting of an external column member resting on a base plate, a middle column member which is telescopically extensible from the external column member, and a central column member which is in turn extensible from the middle column member and on which the camera is mounted. There is also a drive device by which the middle column member can be pressurized pneumatically in relation to the stationary external column member by means of a piston/cylinder unit, with a traction cable or the like which is guided over at least one deflection member mounted rotatably on the middle column member and connected at one end to the central column member and at the other end to the external column member.

In a known column of the above type, the traction cable connection ensures that the central column member, on extension of the middle column member, moves at a higher speed then the middle member. By using the piston/cylinder unit as a drive member, the possibility is afforded of establishing a state of equilibrium, by greater or lesser air supply to the unit (by means of pumps for example,) in all extension positions of the column corresponding to required camera heights. The weight K1 of the camera, central column member etc. is compensated in this connection by the force Km which corresponds to the pressure Pm acting in the piston/cylinder unit. In the event of pneumatic pressurization of the piston/cylinder unit, the volume increase of this unit during the extension is of course taken into account.

To move the central column member together with camera from a lower position into a higher position with the force Km, a quantity of air is required which corresponds to the change in volume of the piston/cylinder unit taking place thereby, and to the pressure Pm corresponding to the force Km to be compensated.

It is already known to connect the cylinder chamber of the piston/cylinder unit to a relatively large storage chamber which is under the same pressure as the cylinder chamber. Corresponding to the greater volume made available, a proportionately great quantity of compressed air under pressure is necessary in order to lift the central column member and bring about a state of equilibrium. If the latter is achieved, then the central column member together with the camera etc. supported by it can, with only very low expenditure of effort, be retracted or displaced by hand into another height position. In the event of a volume ratio of the piston/cylinder chamber to the storage chamber of approximately 1:100, the pressure in the system hardly changes during such displacement, that is to say the change in pressure is so small that the central column is held in the position into which it has been transferred by hand by existing friction forces alone. If the lifting column is part of a stand, the stand feet in conventional embodiments are hollow and the chambers thus created are filled with compressed air at approximately 3 MPa. In general, this does not take place only when at the location where the lifting column is used but also at the location where the lifting column is stored. Filling of the storage chambers does not take place by means of pumps but with the aid of compressed air bottles, and it is even usual to fill up the storage chambers before transport to the place of use. The overall outlay for the production of such lifting columns is thus extraordinarily high and handling is awkward and complicated.

Also known is another solution to the problem of moving the column part carrying the camera to different height positions by hand. This takes place with the aid of a conically shaped expensive piston rod which interacts with a special seal which adapts to the different cross-section conditions during piston movement. Although in this case only low pressures are used, the possible displacement travel is likewise relatively limited, as is the life of the costly special seals.

Lastly, attempts have been made to incorporate spring accumulators with long spring excursion in the travel of the extensible column member, for example in the manner of clockwork springs.

SUMMARY OF THE INVENTION

It has been found that extension and retraction of the central column member by hand can be effectively achieved with substantially lower outlay, if the deflection member over which the traction cable is wound is designed approximately in the form of a truncated cone and has a guide groove, which runs spirally along the cone envelope surface from the region of larger diameter to the region of smaller diameter of the cone. The inner end portion of the cable when the lifting column is in the retracted state, extends from the region of larger diameter of the deflection member to the central column member, while the outer end portion of the cable extends from the region of smallest diameter to the external column member. The deflection member has an additional section which has a guide groove extension on which, during extension of the lifting column, the outer end portion of the cable can be wound, starting from the region of small diameter, according to the unwinding taking place thereby of the inner end portion of the cable.

By inclusion of the deflection member designed according to the invention, with the column members in a practically retracted state, the inner end portion of the cable, which is connected to the central column member, runs with the average radius r2 in a region of the guide groove situated practically on the external perimeter of the deflection member, whereas the outer end portion of the cable, which is fixed to the external column member, runs with the average radius r1 in a guide groove region situated close to the axis of rotation on the external perimeter of the deflection member. If the central column member is situated after pressurization in a balanced state of rest, then the torques K1 r1 and K2 r2 correspond to one another, that is to say a loading of the outer portion of the cable with the force $K1=K2\ r2/r1$ corresponds to the loading of the inner portion of the cable with the force K2. K1 corresponds to the weight loading the central column member, that is to say essentially to the weight of the camera plus the weight of the central column member itself, and can thus be considered a given constant. The sum of the forces $K1+K2$ corresponds, in a state of equilibrium of the central column member, to the force Km, with which the middle column member upwardly loads the deflection member, on which the forces K1 and K2 act in the opposite direction, thus $Km=K1+K2$. From this it may be inferred that $Km=K2+K2\ r2/r1$, and thus $Km = K2(1 + r2/r1)$. This means that, in the event of use of a conventional deflection member, in which the radii r1 and r2 are the same size, Km becomes 2 K2. With a very small r1 in relation to r2, it is necessary in the state of equilibrium to pressurize the piston/cylinder unit with a pressure which corresponds to a relatively high force Km of a multiple of the weight K1. If in this starting position an additional small force Ka, which works in the same direction as Km, is applied by hand, a displacement of the central column member out of the existing state of equilibrium takes place, during which, as a result of the increase in volume of the piston/cylinder unit, there is a reduction in pressure and consequently a reduction of the force Km. At the same time, however, as a result of the increase of the radius r1, the value of $K2(1 + r2/r1)$ also decreases. Thus, with skillful selection of the spiral course of the guide groove, a very sharply defined position of equilibrium can be avoided, that is to say it can be brought about that the central column member can if necessary only by means of slight additional external force be guided out of the respective position upwards or downwards into a different position, in which it subsequently remains. The possibility is nevertheless still afforded of transferring the central column member into another position of equilibrium by changing the pneumatic pressurization of the piston/cylinder unit.

In the embodiment of the deflection member described above, it is assumed that the additional section adjoining the frustoconical section is designed cylindrically so that the lever arm r2, with which force K2 acts upon the deflection member, remains constant during rotation of the deflection member.

It is also advantageous for achieving particularly favorable force ratios, if the additional section of the deflection member is designed similarly to the first section approximately in the form of a truncated cone and is provided with a guide groove running spirally along the cone envelope surface, its region of largest diameter adjoining directly the region of largest diameter of the first section. With this design, the ratio r2/r1 in the relationship $Km = K2 (1 + r2/r1)$ can change from a value over 1 to a value under 1.

While, with the compensation devices mentioned in the introduction, use is usually and necessarily made of storage containers with a volume which is approximately one hundred times greater than the volume of the piston/cylinder unit, use can from now be made, with the deflection member according to the invention, of a storage container with a volume of just under one liter. Additionally, use is made of comparatively low pressures which make it possible to bring about the operating state with the aid of a hand-operable air pump.

BRIEF DESCRIPTION OF DRAWINGS

Further details, advantages and features of the invention emerge from the following description made with reference to the attached drawing, to which attention is expressly drawn in relation to all essential details not mentioned in the description.

FIG. 1 is a somewhat diagrammatic cross-sectional side elevational view of a telescopically extensible lifting column, and FIG. 2 is a cross-sectional front elevational view of the lifting column.

DESCRIPTION OF PREFERRED EMBODIMENT

A telescopically extensible lifting column as shown in the drawing, serves in particular for the height adjustment of a camera (not shown), and comprises an external column member 2 resting on a base plate 1, a middle column member 3 which is telescopically extensible from the first column member, and a central column member 4 which is in turn extensible from the middle column member. The central column member 4 carries an adapter 5 known as a Euroadapter and which serves for mounting a camera, not shown in the drawing.

The lifting column has a drive device, via which the middle column member 3 can be extended in relation to the stationary external column member 2, in the form of a pneumatically pressurizable piston/cylinder unit 6. This consists of a central hollow piston 7 which, starting from the base plate 1, extends upwards into a cylinder 8 which is closed at its upper end. Sealing of the cylinder 8 in relation to the piston 7 is effected by an O-ring 9. The cylinder 8 is connected at its lower end to a plate 10 which in its edge region supports the middle column member 3. On the cylinder head 11, a bearing 12 for a deflection member 13 is fixed, via which a traction cable 14 is guided. By means of its inner end portion 17, the traction cable 14 is connected to the central column member 4, by means of a cable fastening 16 at the lower end of the central column member 4. The outer end portion 15 of the cable is guided through an opening 18 in the plate 10 and fixed to a cable fastening 19 which is connected firmly to the external column member 2 via the hollow piston 7 and the base plate 1.

The deflection member 13 comprises a section 20 designed approximately in the form of a truncated cone which has a guide groove 23, which runs spirally along the cone envelope surface from the region 21 of greatest diameter to the region 22 of smallest diameter, to receive the traction cable 14. In the drawing, the lifting column is illustrated in the retracted state. In this position of the column, members 2, 3 and 4 are retracted relative to one another, the inner end portion of the cable 17 extends from the region 21 of greatest diameter to the central column member 4, while the outer end portion of the cable 15 extends from the region 22 of smallest diameter to the external column member 2.

Section 20 of the member 13, in the form of a truncated cone is adjoined by an additional section 24 which has a guide groove extension and on which, during extension of the lifting column, the inner end portion of the cable 17 can be wound up, starting from the region 21 of greatest diameter, according to the unwinding taking place thereby of the outer end portion of the cable 15. The additional section 24 of the deflection member is, as shown in FIG. 1, designed similarly to the first section 20 approximately in the form of a truncated cone and is provided with a guide groove 25 running spirally along the cone envelope surface. The region of greatest diameter of the frustoconically designed additional section 24 adjoins directly the region 21 of greatest diameter of the first section 20.

FIG. 2 shows that the base plate 1 forms the upper closure of a storage container 26 which, via a supply line 27 and by means of a pressure medium source (not shown), can be set under a pressure Pm to achieve the force Km which holds in equilibrium the forces K1 and K2 of the two cable portions 15 and 17, which act in the opposite direction.

We claim:

1. A telescopically extensible lifting column comprising an external column member, a middle column member telescopically extensible from the external column member, and a central column member extensible from the middle column member, a drive device including a piston/cylinder unit by which the middle column member can be pressurized in relation to the external column member, and a traction cable wound over a deflection member mounted rotatably on the middle column member, the cable having an inner end portion connected to the central column member and an outer end portion connected to the external column member wherein the deflection member comprises a section substantially in the form of a first truncated cone with a guide groove extending spirally along an envelope surface of the cone from a region of larger diameter to a region of smaller diameter, to receive the traction cable, the inner end portion of the cable with the lifting column in a retracted state extending from the region of larger diameter to the central column member, and the outer end portion of the cable extending from the region of smaller diameter to the external column member, the deflection member having an additional section with a guide groove extension on which, during extension of the lifting column, the inner end portion of the cable is wound, accompanied by unwinding of the outer end portion of the cable from the deflection member.

2. A lifting column according to claim 1, wherein the additional section of the deflection member is substantially in the form of a second truncated cone and is provided with a guide groove extending spirally along an envelope surface of the second cone, the second cone having a region of larger diameter adjoining the region of larger diameter of the first cone.

* * * * *